(12) United States Patent
Taverner et al.

(10) Patent No.: US 9,255,836 B2
(45) Date of Patent: Feb. 9, 2016

(54) FIBER OPTIC CABLE FOR DISTRIBUTED ACOUSTIC SENSING WITH INCREASED ACOUSTIC SENSITIVITY

(75) Inventors: Domino Taverner, Delray Beach, FL (US); John J. Grunbeck, Northford, CT (US); James R. Dunphy, South Glastonbury, CT (US); Edward M. Dowd, Madison County, CT (US); Andrew S. Kuczma, Clinton, CT (US); Francis X. Bostick, III, Houston, TX (US); David Labella, Higganum, CT (US); Mark Baker, Wallingford, CT (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 848 days.

(21) Appl. No.: 13/307,765

(22) Filed: Nov. 30, 2011

(65) Prior Publication Data

US 2012/0111104 A1    May 10, 2012

Related U.S. Application Data

(63) Continuation of application No. 13/163,323, filed on Jun. 17, 2011, now abandoned.

(60) Provisional application No. 61/355,924, filed on Jun. 17, 2010.

(51) Int. Cl.
*E21B 49/00* (2006.01)
*G02B 6/00* (2006.01)
(Continued)

(52) U.S. Cl.
CPC ............. *G01H 9/004* (2013.01); *E21B 47/123* (2013.01); *G01V 2210/1429* (2013.01)

(58) Field of Classification Search
CPC ........... G01H 9/004; G01V 2210/1429; E21B 47/123
USPC .................................. 73/643, 152.01; 385/13
See application file for complete search history.

(56) References Cited

U.S. PATENT DOCUMENTS

| 4,115,753 | A | * | 9/1978 | Shajenko .................. 340/854.7 |
| 4,621,896 | A | | 11/1986 | Lagakos |
| 4,979,798 | A | * | 12/1990 | Lagakos et al. .............. 385/12 |

(Continued)

FOREIGN PATENT DOCUMENTS

| WO | 10090132183 A1 | 12/2009 |
| WO | 2011047255 A3 | 4/2011 |

OTHER PUBLICATIONS

Office Action dated Apr. 4, 2013, issued by the Canadian Intellectual Property Office in corresponding Application No. 2,743,696.

(Continued)

*Primary Examiner* — J M Saint Surin
(74) *Attorney, Agent, or Firm* — Patterson & Sheridan, L.L.P.

(57) ABSTRACT

Methods and apparatus for performing Distributed Acoustic Sensing (DAS) using fiber optics with increased acoustic sensitivity are provided. Acoustic sensing of a wellbore, pipeline, or other conduit/tube based on DAS may have increased acoustic sensitivity through fiber optic cable design and/or increasing the Rayleigh backscatter property of a fiber's optical core. Some embodiments may utilize a resonant sensor mechanism with a high Q coupled to the DAS device for increased acoustic sensitivity.

40 Claims, 13 Drawing Sheets

(51) Int. Cl.
*G01H 9/00* (2006.01)
*E21B 47/12* (2012.01)

(56) References Cited

U.S. PATENT DOCUMENTS

| | | | |
|---|---|---|---|
| 5,510,549 A * | 4/1996 | Ashjian et al. | 585/22 |
| 5,633,960 A | 5/1997 | Lagakos | |
| 6,002,646 A * | 12/1999 | Reid et al. | 367/149 |
| 6,787,758 B2 * | 9/2004 | Tubel et al. | 250/227.14 |
| 6,913,079 B2 * | 7/2005 | Tubel | 166/250.01 |
| 7,024,081 B2 | 4/2006 | Dowd et al. | |
| 7,412,118 B1 * | 8/2008 | Shaibani et al. | 385/12 |
| 7,630,066 B2 * | 12/2009 | Kachmar | 356/73.1 |
| 7,946,341 B2 * | 5/2011 | Hartog et al. | 166/254.1 |
| 7,946,350 B2 * | 5/2011 | Greenaway | 166/385 |
| 8,315,486 B2 * | 11/2012 | Pearce et al. | 385/13 |
| 2003/0142939 A1 * | 7/2003 | Gorni et al. | 385/125 |
| 2006/0165344 A1 | 7/2006 | Mendez | |
| 2008/0273852 A1 | 11/2008 | Parker | |
| 2009/0114386 A1 | 5/2009 | Hartog | |
| 2010/0107754 A1 * | 5/2010 | Hartog et al. | 73/152.47 |
| 2011/0280103 A1 | 11/2011 | Bostick, III | |
| 2013/0291642 A1 * | 11/2013 | Crickmore et al. | 73/655 |
| 2013/0308894 A1 * | 11/2013 | Head | 385/12 |
| 2014/0199017 A1 * | 7/2014 | Den Boer et al. | 385/12 |

OTHER PUBLICATIONS

Search Report dated Jan. 30, 2014, issued by the European Patent Office in Application No. 11250594.6.

Qu, Zhigana et al, "Detection of the abnormal events along the oil and gas pipeline and multi-scale chaotic character analysis of the detected signals; Detection of the abnormal events along the oil and gas pipeline and multi-scale chaotic character analysis," Measurement Science and Technology, IOP, Bristol, GB, vol. 19, No. 2, Jan. 14, 2008.

* cited by examiner

FIBER OPTIC CABLE FOR DISTRIBUTED ACOUSTIC SENSING WITH INCREASED ACOUSTIC SENSITIVITY

CROSS-REFERENCE TO RELATED APPLICATIONS

This application is a continuation of U.S. patent application Ser. No. 13/163,323, filed on Jun. 17, 2011 now abandoned, which claims benefit of U.S. Provisional Patent Application Ser. No. 61/355,924, filed Jun. 17, 2010, both of which are herein incorporated by reference.

BACKGROUND OF THE INVENTION

1. Field of the Invention

Embodiments of the present invention generally relate to methods and apparatus for performing acoustic sensing based on Distributed Acoustic Sensing (DAS) with increased acoustic sensitivity.

2. Description of the Related Art

Sensing of a wellbore, pipeline, or other conduit/tube (e.g., based on acoustic sensing) may be used to measure many important properties and conditions. For example, formation properties that may be important in producing or storing fluids in downhole reservoirs comprise pressure, temperature, porosity, permeability, density, mineral content, electrical conductivity, and bed thickness. Further, fluid properties, such as pressure, temperature, density, viscosity, chemical elements, and the content of oil, water, and/or gas, may also be important measurements. In addition, downhole-logging tools based on sonic well logging systems may be used to measure downhole properties such as formation porosity, location of bed boundaries and fluid interfaces, well casing condition, and behind casing cement location and bonding quality. Monitoring properties and conditions over time may have significant value.

FIG. 1 illustrates a schematic cross-sectional view of a wellbore 102, wherein a distributed acoustic sensing (DAS) system 110 may be used to perform acoustic sensing. A DAS system may be capable of producing the functional equivalent of 10's, 100's, or even 1000's of acoustic sensors. Properties of downhole formations surrounding or otherwise adjacent the wellbore 102 may be monitored over time based on the acoustic sensing. Further, hydrocarbon production may be controlled or reservoirs 108 may be managed based on the downhole formation properties sensed by in-well acoustic measurement methods using the DAS system 110.

The wellbore 102 may have a casing 104 disposed within, through which production tubing 106 may be deployed. The DAS system 110 may comprise an acoustic energy source and a DAS device. The acoustic energy source may emit acoustic signals downhole. An optical waveguide, such as an optical fiber, within the wellbore 102 may function as the DAS device, measuring disturbances in scattered light that may be propagated within the waveguide (e.g., within the core of an optical fiber). The disturbances in the scattered light may be due to the acoustic signals, wherein the acoustic signals may change the index of refraction of the waveguide or mechanically deform the waveguide such that the Rayleigh scattered signal changes.

Acoustic sensing based on DAS may use the Rayleigh backscatter property of the fiber's optical core and may spatially detect disturbances that are distributed along the fiber length. Such systems may rely on detecting phase changes brought about by changes in strain along the fiber's core. Externally generated acoustic disturbances may create very small strain changes to optical fibers. The acoustic disturbance may also be reduced or masked by a cable in which the fiber is deployed. In order to better detect changes in strain from acoustic disturbances, a fiber optic cable that has increased acoustic sensitivity is desired.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatus for performing Distributed Acoustic Sensing (DAS) using fiber optics with increased acoustic sensitivity. Acoustic sensing of a wellbore, pipeline, or other conduit/tube based on DAS may have increased acoustic sensitivity through fiber optic cable design, increasing the Rayleigh backscatter property of a fiber's optical core, and/or using inclusions or attachments to the cable or fiber.

Figure 1:
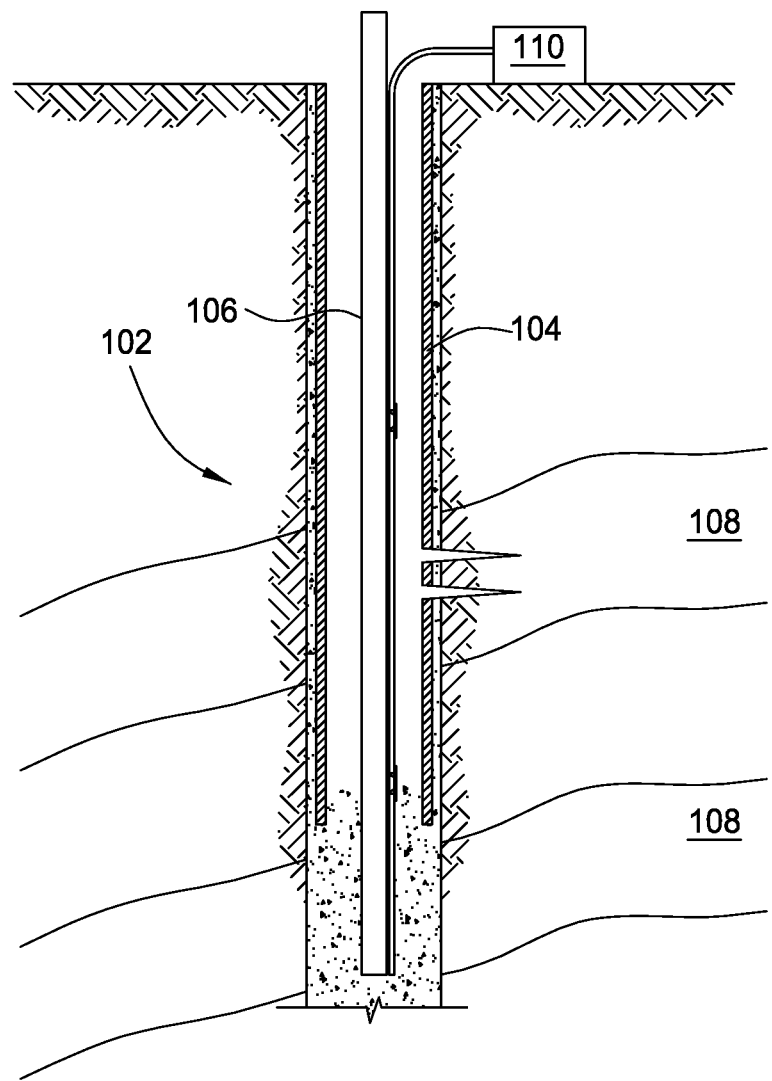
FIG. 1 is a schematic cross-sectional view of a wellbore with an optical fiber for Distributed Acoustic Sensing (DAS) deployed downhole.
Figure 2:
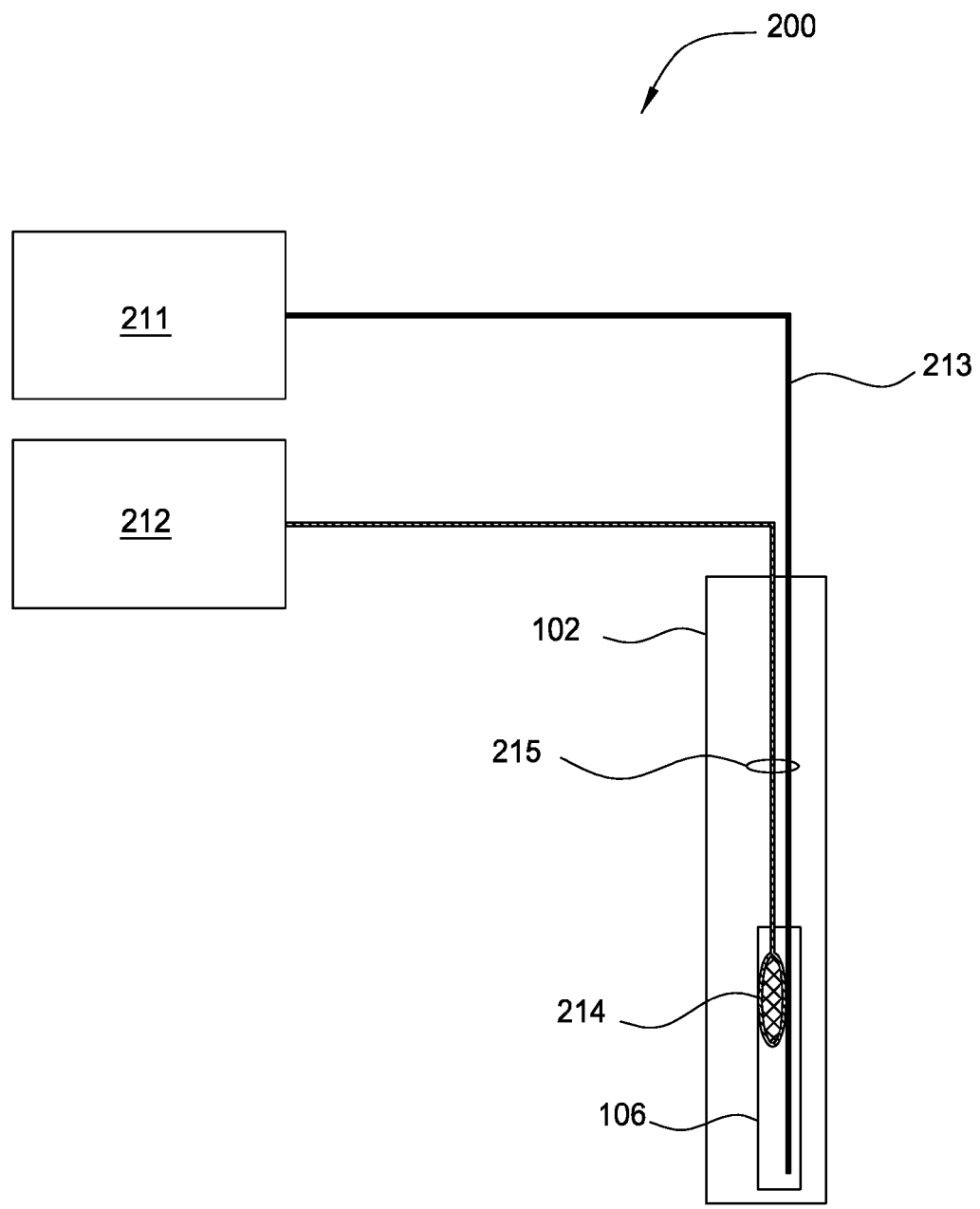
FIG. 2 illustrates a DAS system using an acoustic energy source and a distributed acoustic sensing (DAS) device both embedded within a cable, according to an embodiment of the present invention.

FIG. 2 illustrates an embodiment of a DAS system 200, comprising an acoustic energy source 214 and a DAS device 213 both embedded within a cable 215 inside the wellbore 102, such as within the production tubing 106, as shown. For some embodiments, a portion of the DAS system 200 may be permanently emplaced for sonic well logging. The acoustic energy source 214 may be controlled by an acoustic energy source controller 212, typically disposed at the surface. For example, the controller 212 may transmit electrical pulses in an effort to stimulate piezoelectric elements in the acoustic energy source 214 to generate acoustic signals. The controller 212 may manage the pulse width and duty cycle of such electrical pulses.

A DAS instrument 211 may introduce an optical pulse, using a pulsed laser, for example, into the DAS device 213. The DAS instrument 211 may also sense disturbances in the light propagating through the DAS device 213. The disturbances in the light may be due to the acoustic signals, wherein the acoustic signals may change the index of refraction of the DAS device 213 or mechanically deform the DAS device 213 such that the Rayleigh scattered signal changes. For some embodiments, rather than the acoustic signals being generated by the acoustic energy source 214, the acoustic signals may be generated passively (i.e., passive acoustic source), such as sounds produced from a valve or a turbulent flow within the wellbore 102 (e.g., gurgling or whistling), rather than from the active acoustic energy source 214. For some embodiments, the passive acoustic signals may comprise seismic or micro-seismic activity in a formation surrounding a conduit.

The DAS instrument 211 may send an optical signal into the DAS device 213 and may look at the naturally occurring reflections that are scattered back all along the DAS device 213 (i.e., Rayleigh backscatter), wherein the DAS device 213 may have increased acoustic sensitivity, as will be described in greater detail below. For some embodiments, the wavelength of the optical signal sent by the DAS instrument 211 may be optimized for increased Rayleigh backscatter. Shorter wavelengths, which may reach a determined penetration depth, may produce greater Rayleigh backscatter within the DAS device 213, allowing for increased acoustic sensitivity. However, shorter wavelengths may limit the measurement range of the DAS device 213.

By analyzing these reflections and measuring the time between the optical signal being launched and the signal being received, the DAS instrument 211 may be able to measure the effect of the acoustic signal on the optical signal at all points along the waveguide, limited only by the spatial resolution. For some embodiments, acoustic sensing based on DAS may be used in various other conduits besides the wellbore 102 (e.g., within a pipeline), but acoustic sensing performed within a wellbore will mainly be discussed hereinafter.

Figure 3:
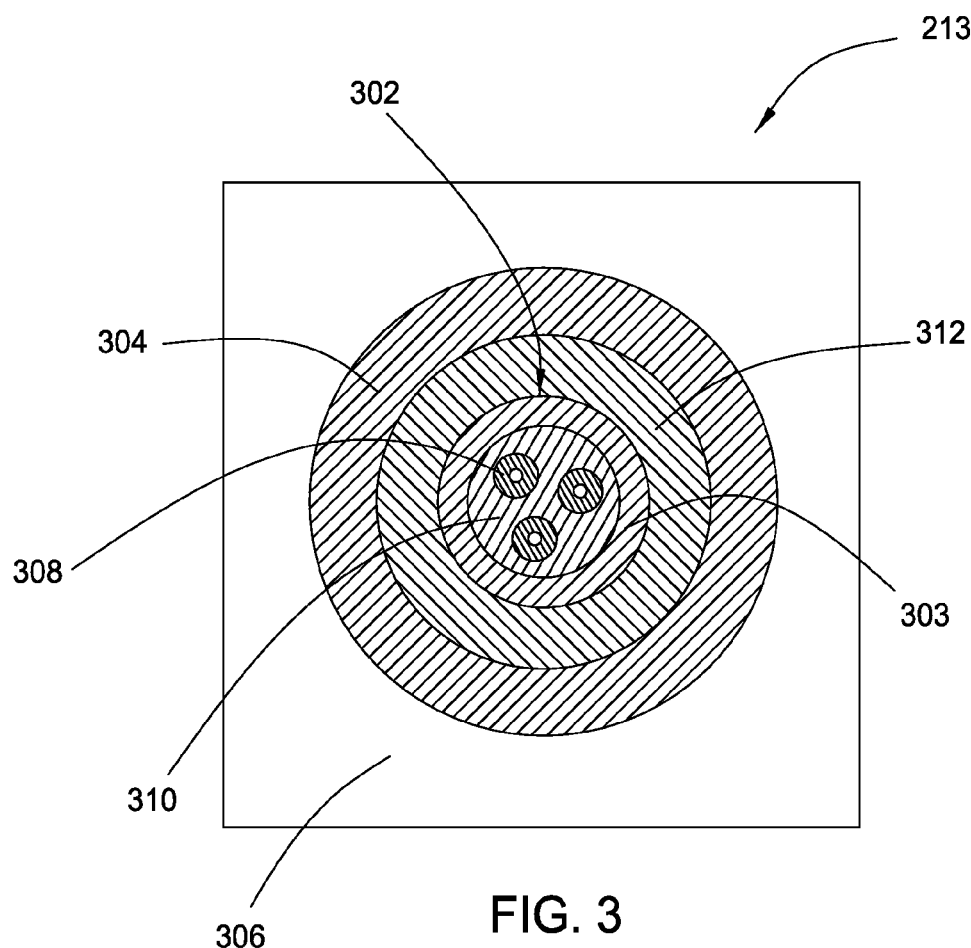
FIG. 3 is a cross-sectional view of a fiber optic cable suitable for use as a DAS device, according to an embodiment of the present invention.

For some embodiments, the DAS device 213 may have increased acoustic sensitivity when compared to conventional optical fibers or fiber optic cables, wherein the acoustic energy that is transmitted from the surface of a fiber optic cable to fibers inside the cable may be increased by lowering the bulk modulus and/or increasing the acoustic coupling of the DAS device 213. FIG. 3 illustrates an embodiment of a cross-sectional view of a fiber optic cable suitable for use as the DAS device 213, where the suitable cable may comprise a fiber in metal tube (FIMT), somewhat similar to that described in U.S. Pat. No. 7,024,081 to Dowd et al., issued Apr. 4, 2006, which is hereby incorporated by reference in its entirety. The DAS device 213 may comprise an FIMT 302 disposed in a protective outer tube (i.e., an armor layer) 304. The FIMT 302 may comprise an inner tube 303 surrounding one or more optical fibers 308, three of which are shown in the embodiment depicted in FIG. 3. The optical fibers 308 may comprise a core, a cladding around the core, and a fiber coating surrounding the cladding. The inner tube 303 may comprise any of various suitable materials, such as metal. Although the above-described DAS device comprises a FIMT, which will be described further herein, it may not be required.

Figure 4:
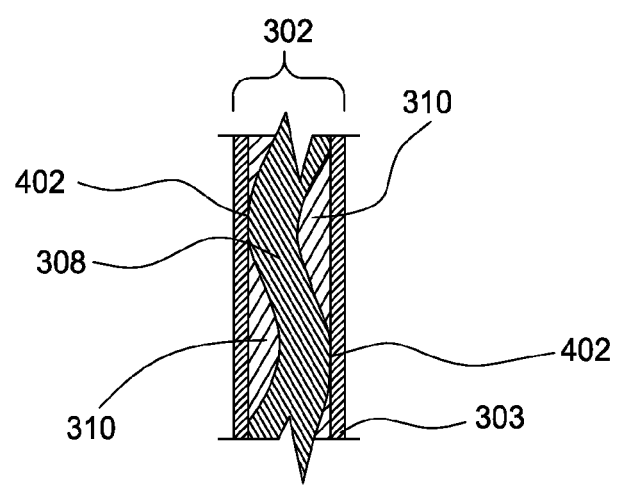
FIG. 4 is a partial sectional side view of a fiber in metal tube (FIMT) that may be disposed within the optic cable of FIG. 3, according to an embodiment of the present invention.

A filler material 310 may be disposed in the inner tube 303 and substantially fill (e.g., about 50%) the void spaces within the inner tube 303 surrounding the optical fibers 308 in an effort to support and prevent the optical fibers 308 from moving excessively within the inner tube 303, thereby reducing resonant frequencies. The filler material may comprise any of various suitable materials, such as one or more composites. For some embodiments, there may be air gaps between the optical fibers 308 and the inner tube 303. For some embodiments, the optical fibers 308 may be embedded into the filler material 310. As the inner tube 303 and optical fibers 308 are not retained relative to one another, the serpentine orientation of an optical fiber 308 within the inner tube 303 (shown in FIG. 4) results in intermittent contact points 402 therebetween. Although FIG. 4 portrays only one optical fiber 308, one or more optical fibers 308 may have a serpentine orientation within the inner tube 303.

Suitable filler materials 310 may comprise, but are not limited to, conventional thixotropic gels, grease compounds, and foams commonly used in the fiber optic cable industry for water blocking, filling and lubrication of optical fiber cables. For some embodiments, the fill percentage of the filler material 310 may be increased to enhance acoustic coupling between the inner tube 303 and the optical fibers 308 (e.g., up to 100%, but there may be limitations due to thermal expansion of the filler material 310). Although the embodiment illustrated in FIG. 3 and described herein uses three optical fibers 308 in the inner tube 303, it is contemplated that one or more fibers 308 may be used.

The FIMT 302 may be surrounded by the outer tube 304 and be configured to provide a gap 312 therebetween. For some embodiments, a material similar to the filler material 310 may be used to fill the gap 312, thereby enhancing acoustic coupling between the FIMT 302 and the outer tube 304. For some embodiments, the DAS device 213 may comprise an encapsulant material to enhance acoustic coupling between the outer tube 304 and an environment surrounding the outer tube 304.

For some embodiments, a polymer/composite tubing may be disposed over the inner tube 303 to further enhance acoustic coupling, wherein an increased acoustic energy may be transferred to the at least one optical fiber 308. For some embodiments, the inner tube 303 may also be replaced with the polymer/composite tubing. Furthermore, for some embodiments, a polymer/composite jacket 306 may be disposed over the outer tube 304, wherein the jacket 306 may have various shapes and sizes in an effort to increase coupling to the production tubing 106 or formation (e.g., square, round, parabolic, or elliptical). The material for the polymer/composite tubing or jacket 306 may be selected for increased acoustic coupling. The desired polymer/composite may most likely have high elasticity and a low bulk modulus.

Figure 5:
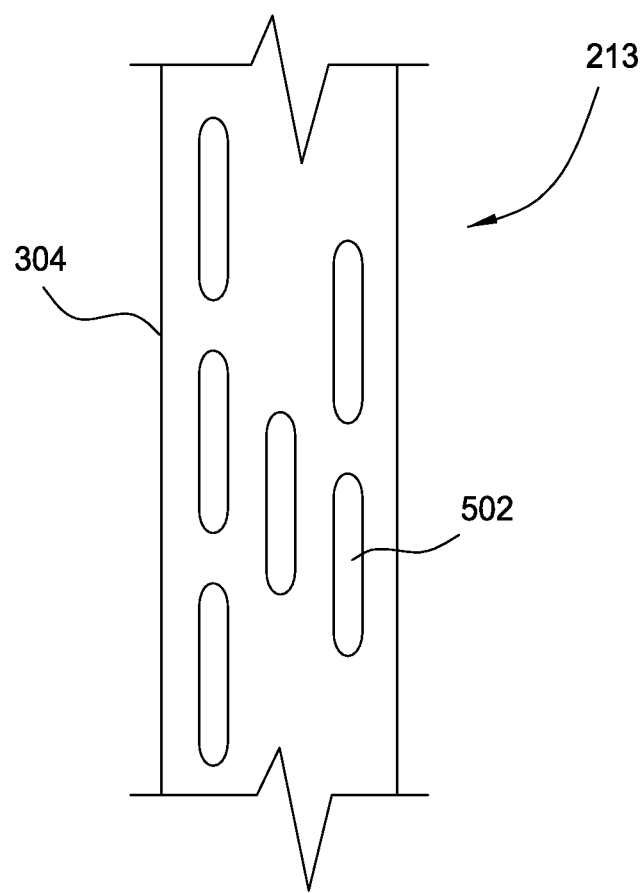
FIG. 5 is a partial side view of the optic cable of FIG. 3 illustrating slotted holes in an armor layer of the cable, according to an embodiment of the present invention.

FIG. 5 illustrates an embodiment of a partial side view of the optic cable of FIG. 3 suitable for use as a DAS device 213. The outer tube 304 may comprise one or more slotted holes 502 to allow fluid ingress. Referring back to FIG. 4, the slotted holes 502 may allow fluid to collect in the gaps 312, thereby enhancing acoustic coupling between the FIMT 302 and the outer tube 304. Since fluids may have different compositions, the fluids allowed through the slotted holes 502 may provide different levels of acoustic sensitivity along the DAS device 213, which may be problematic. For some embodiments, the slotted holes 502 may allow salt water in, which may corrode the inner tube 303 of the FIMT 302, so corrosion-resistant material may be used for the inner tube 303.

Figure 6:
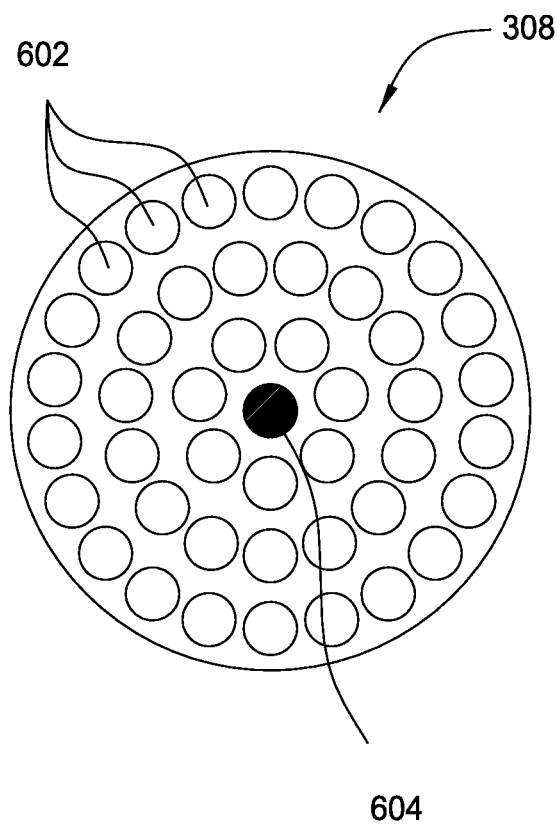
FIG. 6 is a cross-sectional view of a microstructured optical fiber that may be disposed within the optic cable of FIG. 3, the cladding of the fiber having one or more holes running lengthwise within the core, according to an embodiment of the present invention.

For some embodiments, the optical fiber may have increased acoustic sensitivity by changing the bulk modulus of the optical fiber itself. This may be accomplished by introducing holes lengthwise within the cladding of the fiber. FIG. 6 illustrates an embodiment of a cross-sectional view of a microstructured optical fiber suitable for use as optical fibers 308. The air, other gas, or liquids within holes 602 may reduce the modulus of the fiber structure so that the fiber core 604 may be more affected by external pressures, such as that created by an acoustic wave. The size, number, and location of the holes 602 along the fiber 308 may be designed as to not affect the waveguide properties of the fiber 308, but may enhance the strain sensitivity (e.g., arranging the holes 602 such that the pressures created by the acoustic wave remain focused on the fiber core 604).

Optical fibers made with holes may be known as "holey fibers" or "microstructured fibers." For some embodiments, holes and other microstructures may be embedded into the fiber 308 during a drawing process, which may improve the distributed acoustic sensing capability of the DAS device 213.

Figure 7A:
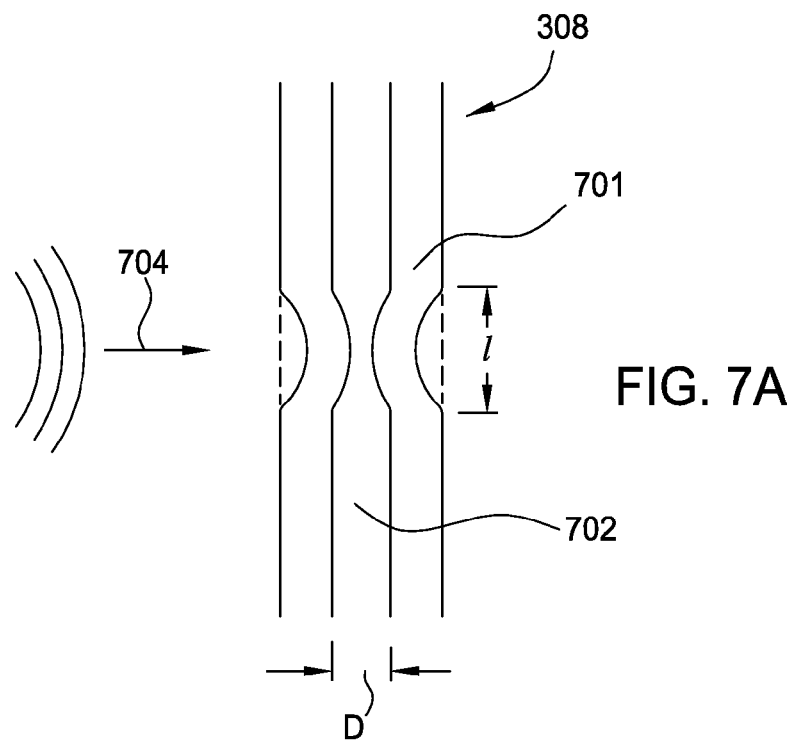
FIGS. 7A and 7B are partial sectional side views of optical fibers that may be disposed within the optic cable of FIG. 3, wherein varied effects are shown on different diameters of the optical fibers, according to an embodiment of the present invention.

FIG. 7A illustrates an embodiment of a partial side view of a typical fiber 308 that may be disposed within a fiber optic cable suitable for use as a DAS device 213. The optical fiber 308 may comprise a fiber coating 701 and a cladding 702 surrounding a core 800 (shown in FIG. 8), wherein the cladding 702 has a diameter D (e.g., a standard optical fiber cladding diameter of 125 µm). Downhole acoustic signals 704 may hit the DAS device 213, wherein the signals 704 may propagate to the inside of the DAS device 213 and thereby change the index of refraction of the cladding 702 (and that of the core 800) or mechanically deform the optical fiber a length l by compressing the coating 701, and hence the cladding 702, with the acoustic signal 704 (i.e., creating a local Poisson-effect reaction).

Figure 7B:
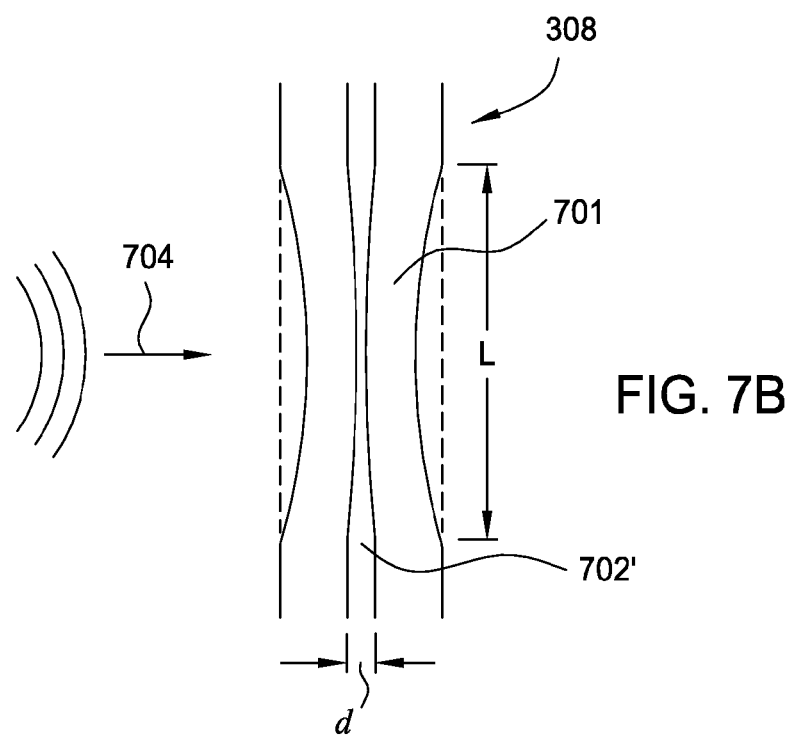

For some embodiments, by reducing the diameter of the optical fiber, or more specifically, the diameter of the cladding, the optical fiber may have increased acoustic sensitivity. FIG. 7B illustrates an embodiment of a partial side view of a fiber 308 that may be disposed within a fiber optic cable suitable for use as a DAS device 213, wherein the cladding 702' has a smaller diameter d (e.g., a diameter of about 80 µm). Downhole acoustic signals 704 may hit the DAS device 213, wherein the signals 704 may propagate to the inside of the cable and thereby change the index of refraction of the cladding 702' (and that of the core 800) or mechanically deform the waveguide a length L, where L>l. The signals 704 may mechanically deform the optical fiber by stretching a local section of the fiber, such that the fiber may be lengthened. Fibers having a smaller diameter may be deformed or stretched a greater length because it may take substantially less energy to deform the fibers.

Although the lengthening or compression of the fiber may be microscopic in practice, the lengthening or compression has been overemphasized in FIGS. 7A and 7B for illustrative purposes.

Figure 8:
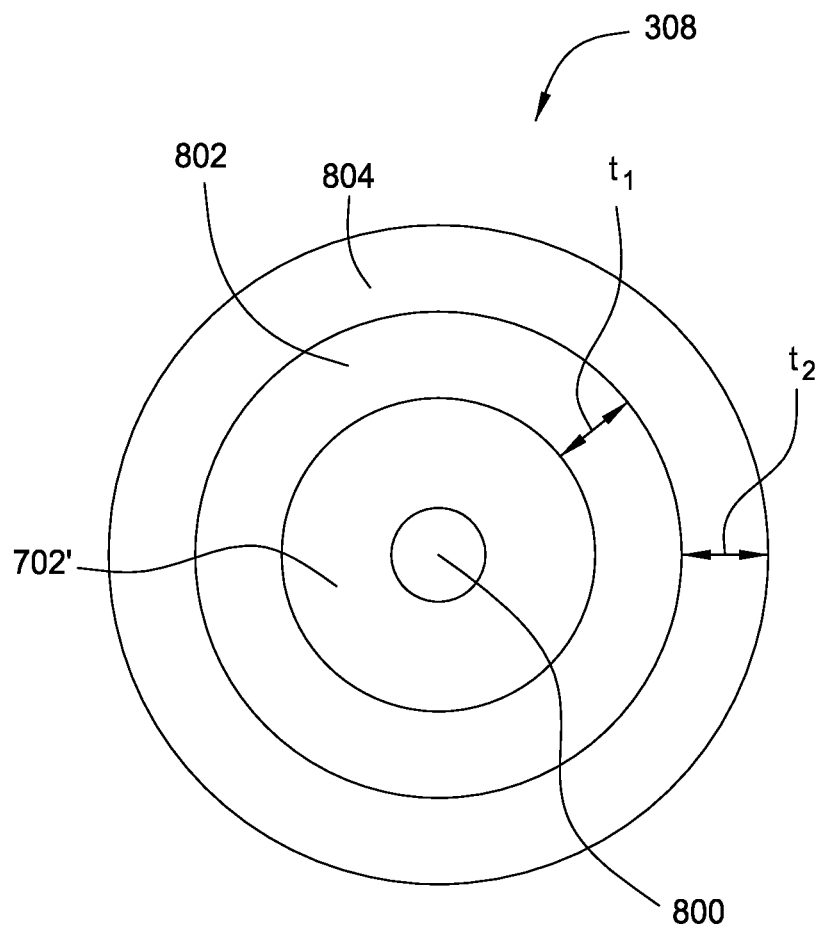
FIG. 8 illustrates a cross-sectional view of an optical fiber that may be disposed within the optic cable of FIG. 3, the fiber coating having one or more graded layers and/or varied thicknesses, according to an embodiment of the present invention.

Further, for some embodiments, the DAS device 213 may be designed for increased acoustic sensitivity by changing (e.g., lowering) the modulus of the fiber coating 701. For some embodiments, the thickness of the fiber coating 701 may be changed (e.g., by increasing the thickness). For some embodiments, the fiber coating 701 may have graded layers with different materials and/or thicknesses. Since the fiber coating 701 may be coupled directly to the optical fiber 702', the fiber coating 701 may pull/strain the cladding 702' when acoustic signals 704 hit the DAS device 213 and propagate to the inside of the DAS device 213. FIG. 8 illustrates an embodiment of a cross-sectional view of a fiber 308 that may be disposed within a fiber optic cable suitable for use as a DAS device 213, comprising the core 800, a cladding 702' surrounding the core, and graded layers 802, 804 of the fiber coating. The graded layers 802, 804 may comprise different materials and have different thicknesses (e.g., $t_2 > t_1$). Although only two graded layers 802, 804 are depicted in FIG. 8, the fiber 308 may comprise one, two, or more fiber coating layers.

For some embodiments, the DAS device 213 may have increased acoustic sensitivity by using different core materials or index profiles to enhance the Rayleigh backscatter of the at least one fiber within the DAS device 213 (i.e., modifying the fiber composition). For some embodiments, one or more sections of the fiber may have increased acoustic sensitivity to provide localized Rayleigh backscatter. The fiber or sections of the fiber may be highly doped with germanium (Ge) to increase Rayleigh scattering (i.e., modify dopants to increase Rayleigh scattering). For some embodiments, the fiber may be a higher numerical aperture fiber. For some embodiments, the DAS device 213 may comprise a plastic optical fiber, which may have a lower bulk modulus than traditional glass fibers, wherein the lower bulk modulus may yield increased acoustic sensitivity.

Figure 9:
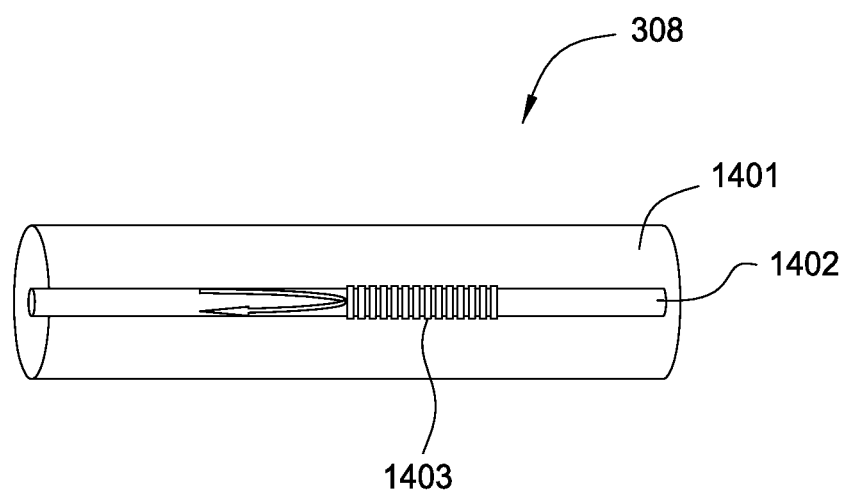
FIG. 9 is a partial sectional side view of an optical fiber that may be disposed within the optic cable of FIG. 3, wherein a core of the fiber comprises a modulated Rayleigh scatter cross-section, according to an embodiment of the present invention.

The DAS instrument 211 may be sensitive to the phase changes in the randomly distributed Rayleigh scatter profile of fibers that may be disposed within a fiber optic cable suitable for use as a DAS device 213. The sensitivity of the DAS measurement may be enhanced by using a fiber with a modulated Rayleigh scatter profile to increase the sensitivity to phase changes. FIG. 9 illustrates an embodiment of a partial side view of an optical fiber 308 that may be disposed within a fiber optic cable suitable for use as a DAS device 213, the optical fiber 308 comprising a cladding 1401 and a core 1402, wherein the core 1402 may comprise a modulated Rayleigh scatter cross-section 1403. Typical factors that affect the Rayleigh scatter profile are doping type, concentration and profile, mode diameter, and mode profile. Such modulation may be created during the production of the fiber 308, for example, by modulating the draw parameters or by a modulated preform. Such modulation may also be induced by processing the fiber 308, for example by thermal, chemical, photochemical, or mechanical means. For some embodiments, the modulation may be written into a long-period fiber grating (LPFG) to create unique acoustic signatures along the length of the DAS device 213.

Figure 10:
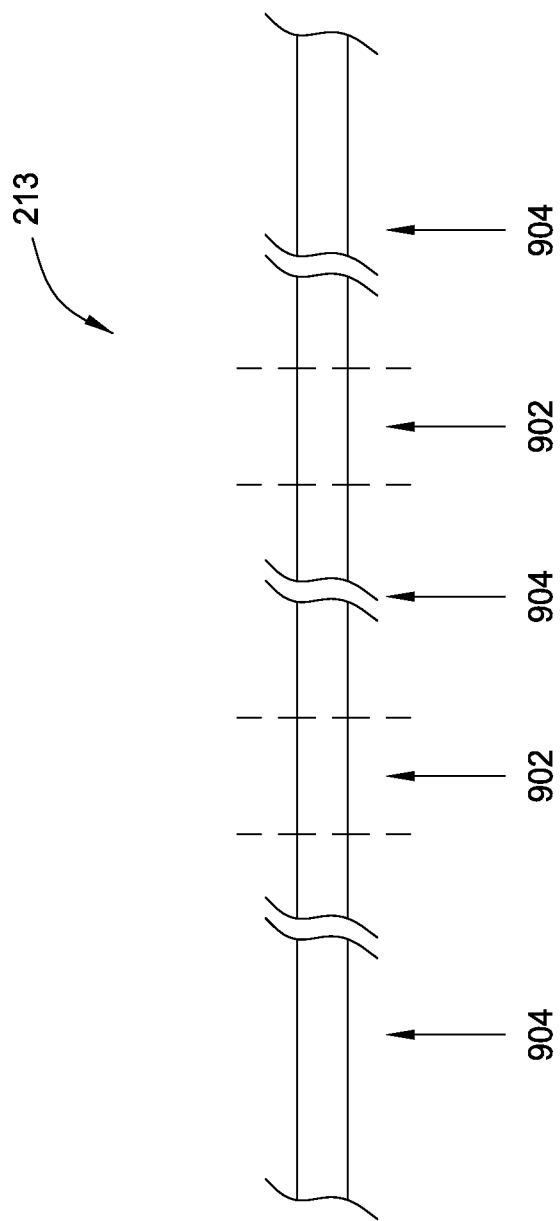
FIG. 10 illustrates a DAS device having one or more localized sensing regions, wherein the regions have increased acoustic sensitivity, according to an embodiment of the present invention.

For some embodiments, the DAS device 213 may comprise one or more localized sensing regions along the length of the device 213, wherein the localized sensing regions may have increased acoustic sensitivity as mentioned above in previous embodiments. The localized sensing regions may be placed in areas of the conduit/tube where acoustic measurements may be desired. The remaining portions of the DAS device 213 may comprise a standard fiber functioning as a transmission line. FIG. 10 illustrates a DAS device 213 comprising the one or more localized sensing regions 902 and other segments 904 of the DAS device 213 functioning as a transmission line. For some embodiments, the localized sensing regions may comprise a combination of the embodiments described above. For example, one localized sensing region may include a DAS device with the FIMT with slotted holes in the armor layer (FIG. 5), and another localized sensing region may have a DAS device with a smaller diameter fiber of about 80 μm (FIG. 7B).

For some embodiments, one sensing region 902 may have a first modulation (or an LPFG with a first modulation), while a second sensing region 902 may have a second modulation (or an LPFG with a second modulation) different from the first modulation, wherein the different modulations may allow one to distinguish the sensing regions 902.

Figure 11:
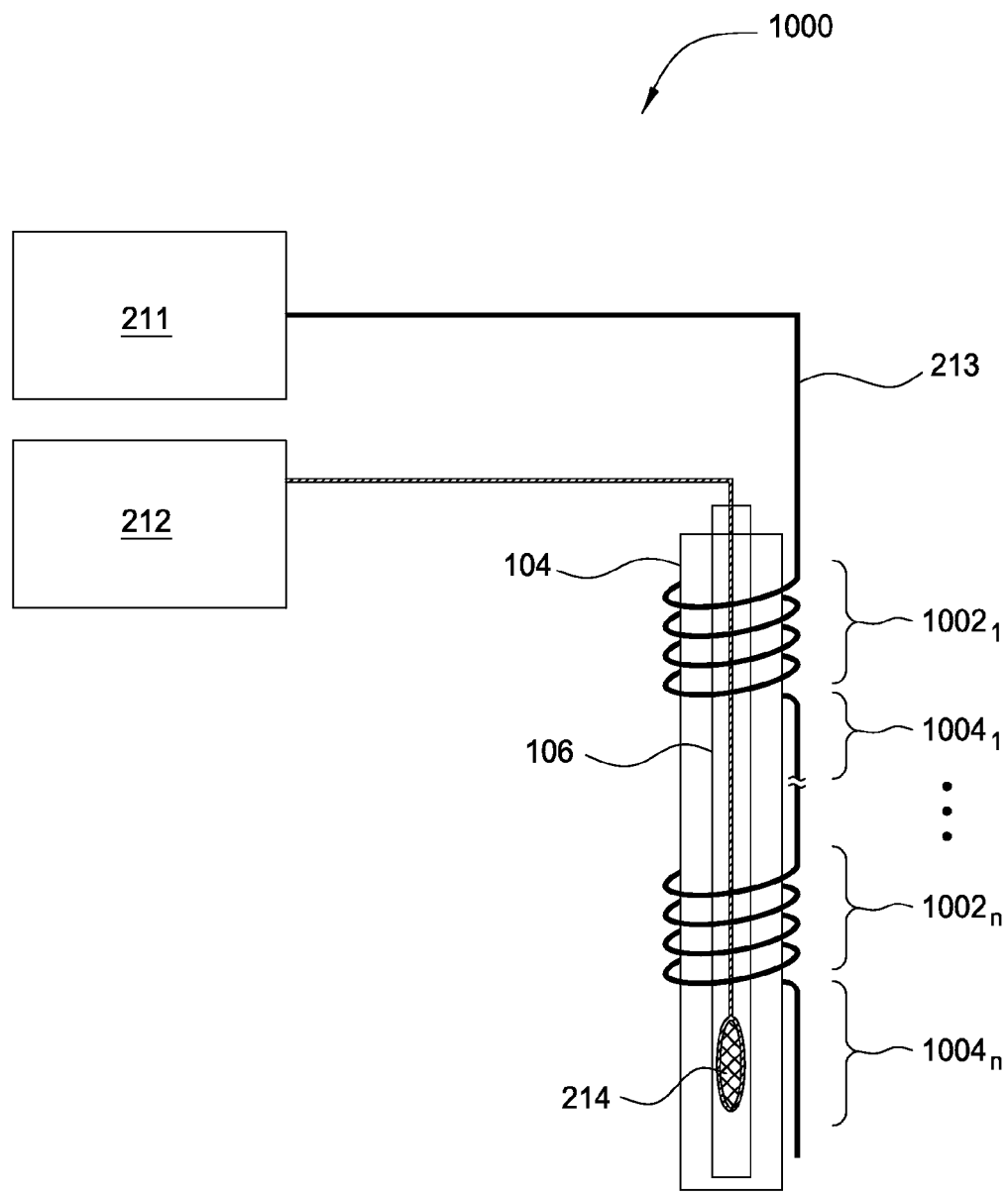
FIG. 11 illustrates a DAS system using a wireline-conveyed acoustic energy source and a DAS device wrapped in a spiral manner outside a casing of a wellbore at certain casing locations, according to an embodiment of the present invention.

For some embodiments of the present invention, it may be desired to perform acoustic sensing at discrete circumference areas or lengths along a conduit/tube. FIG. 11 illustrates an embodiment of a DAS system 1000 using a wireline-conveyed acoustic energy source 214 and a DAS device 213 wrapped in a spiral manner outside the casing 104 of the wellbore 102 for at least one length $1002_1$ along the casing 104 to perform in-depth acoustic sensing. Wrapping the DAS device 213 for the at least one length $1002_1$ may allow more dense measurements to be made along the at least one length $1002_1$, due to the increased number of functionally equivalent acoustic sensors, thereby increasing sensitivity in this region. For some embodiments, the at least one length $1002_1$ along the casing 104 to perform in-depth acoustic sensing may comprise the localized sensing region 902.

In other areas $1004_1$ along the casing 104 where less dense, more typical acoustic sensing may be performed, the DAS device 213 may run outside along the length of the casing 104 as in previous embodiments. There may be up to n areas wherein in-depth and more typical acoustic sensing may be performed ($1002_n$ and $1004_n$). For some embodiments, the other areas $1004_1$ along the casing 104 may comprise the other segments 904 of the DAS device 213 (e.g., standard glass optical fiber).

Figure 12:
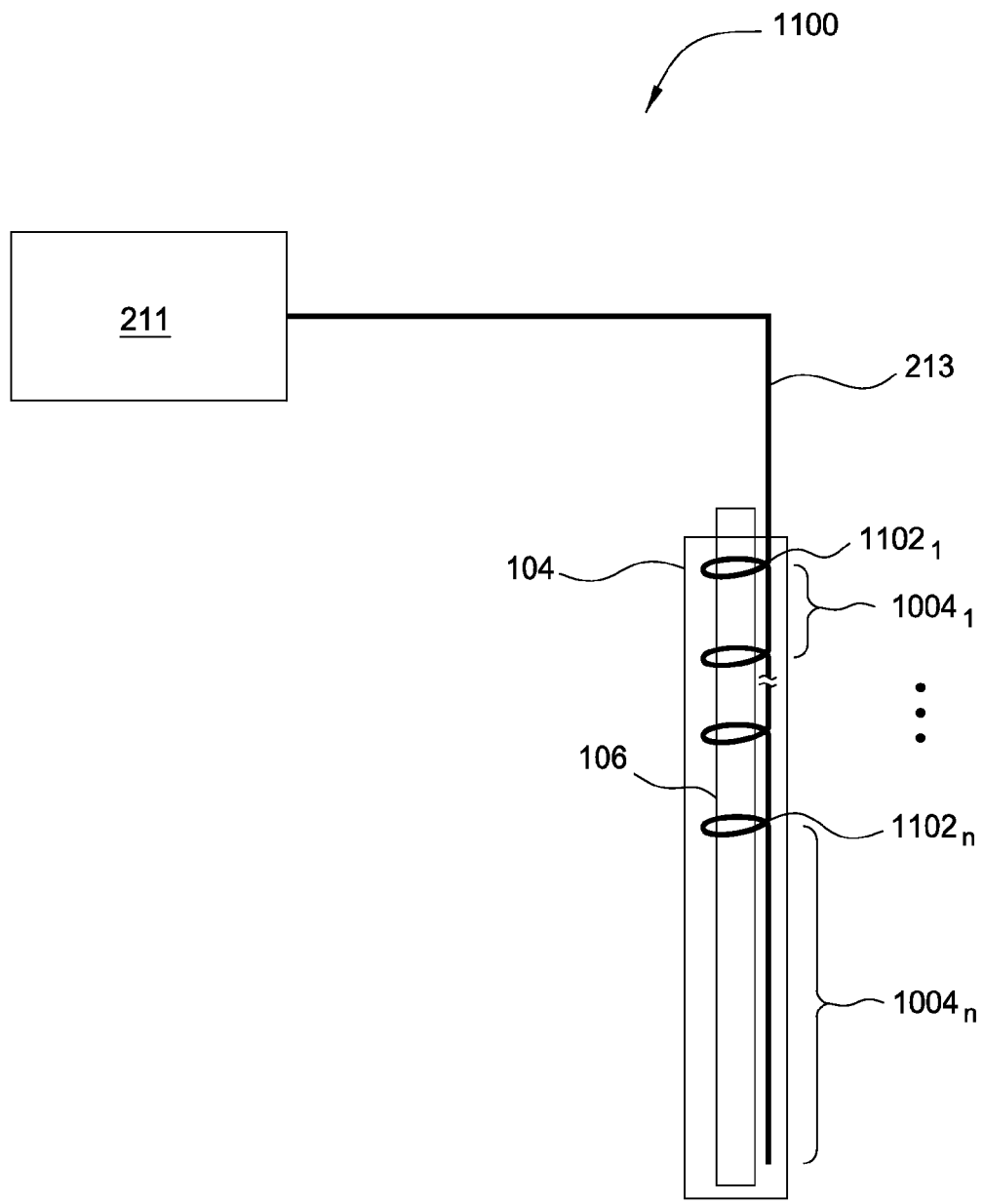
FIG. 12 illustrates a DAS system using a DAS device wrapped around a tubing inside of a casing of a wellbore at certain tubing locations, according to an embodiment of the present invention.

FIG. 12 illustrates an embodiment of a DAS system 1100 using a DAS device 213 circularly wrapped around the tubing 106 of the wellbore 102 for at least one discrete circumference $1102_1$ along the tubing 106 to perform in-depth acoustic sensing. The acoustic signals may be generated passively, such as sounds produced from a valve or a turbulent flow within the wellbore 102 (e.g., gurgling or whistling), rather than from the active acoustic energy source 214. The discrete circumference $1102_1$ may comprise one or more wrappings of the DAS device 213, wherein the wrappings may overlap one another. For some embodiments, the at least one circumference $1102_1$ along the tubing 106 to perform in-depth acoustic sensing may comprise the localized sensing region 902.

In the other areas $1004_1$ along the tubing 106 where less dense, more typical acoustic sensing may be performed, the DAS device 213 may run outside along the length of the tubing 106 as in previous embodiments. There may be up to n areas wherein both in-depth and more typical acoustic sensing may be performed ($1102_n$ and $1004_n$). Some embodiments may have a combination of spiral and circular wrapping at different areas around the casing 104 or the tubing 106. For some embodiments, the other areas $1004_1$ along the casing 104 may comprise the other segments 904 of the DAS device 213 (e.g., standard glass optical fiber).

For some embodiments, local attachments may be added to the DAS device 213 to provide increased acoustic sensitivity. For such embodiments, mechanical amplifiers (e.g., resonant sensor mechanisms) may be incorporated to create a quasi-distributed acoustic sensing array. Examples of resonant sensor mechanisms comprise tuned mechanical amplifiers such as Helmholtz cavity structures, tuning fork structures, or flextensional structures. For some embodiments, the local attachments may be added at particular locations, such as noted in FIG. 10 (e.g., sensing regions 902), in order to create the quasi-distributed array of sensitizing components. The resonant sensor mechanisms may be arranged with any of the DAS devices described herein, any conventional DAS device, or any future developed DAS device. As another example of components that may be added to the DAS device 213 to provide increased acoustic sensitivity, portions of the DAS device 213 may be clamped to the tubing 106 by clamps, creating physical contact between the DAS device 213 and the tubing 106. Therefore, the portions of the DAS device 213 that are clamped to the tubing 106 may have increased acoustic sensitivity.

To excite the resonant sensor mechanisms, the acoustic energy source 214 may be operated in a tone burst mode that may be decoded by the DAS instrument 211 (i.e., excitation frequency). The tone burst mode of the source 214 may provide a format for accomplishing two purposes: (1) creating a tone that matches the resonant frequency of the sensitizing components and (2) providing the normal pulsing sequence that is necessary for time-of-flight based location measurements. As described earlier, the acoustic source may be passive, as long as the acoustic source produces the resonant frequencies of the sensitizing components. Also, to enhance the position resolution, the tone burst mode may encode many different frequencies, thereby selectively exciting and interrogating variously spaced resonant sensitizing components. In other words, the resonant sensor mechanisms may be interrogated using the acoustic energy source in a tone burst mode so as to enable signal processors to conduct non-crosstalking measurements of individual resonant sensor mechanisms. For example, variously spaced valves may be designed to generate an acoustic signal at different frequencies.

The resonant sensing mechanisms may have one or more types of configurations. For some embodiments, the resonant sensing mechanisms may be attachments to the DAS device 213. For example, the mechanisms may be attached to an outer tube or an inner tube of the DAS device 213. As another example, the mechanisms may be attached to one or more fibers within the inner tube. For some embodiments, the resonant sensing mechanisms may be added serially inline with the DAS device 213.

Figure 13:
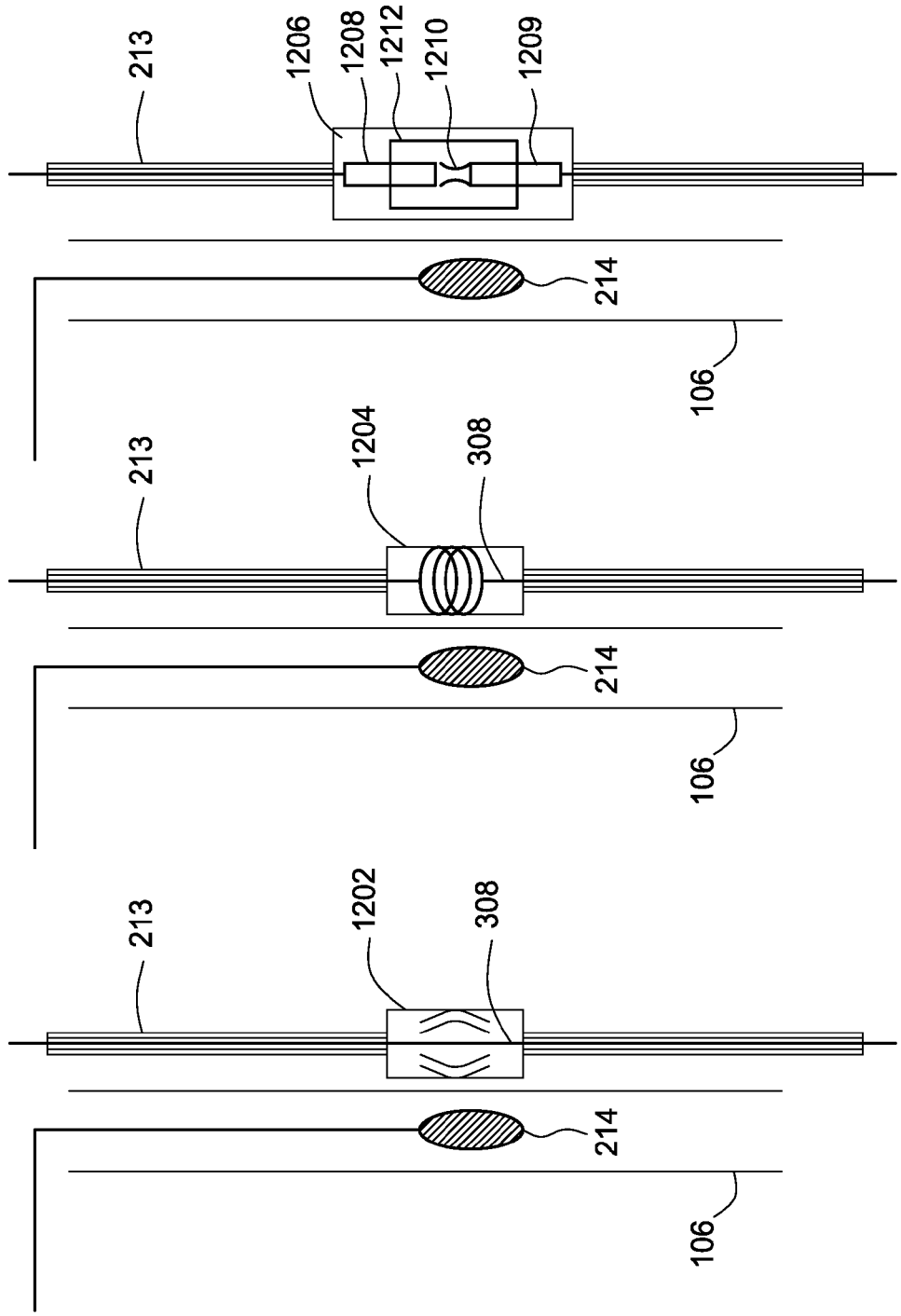
FIGS. 13A-C illustrate a DAS system using a resonant sensor mechanism added to a DAS device to provide increased acoustic sensitivity, according to embodiments of the present invention.

FIG. 13A illustrates an embodiment of a DAS system, wherein one or more resonant sensing mechanisms 1202 may be attachments to the DAS device 213. The mechanism 1202 may provide for the retention of the exterior of the DAS device 213, and then pass the internal fibers 308 of the DAS device 213 through the mechanism 1202. The attached mechanism 1202 may resonate at the frequency of the source tone (i.e., excitation frequency) and may exhibit a high quality factor (Q). Therefore, the mechanism 1202 may enhance the configuration sensitivity by amplifying the acoustic pressure field on the fibers 308. The amplified acoustic pressure field may provide for enhanced acoustic signals detected by the DAS instrument 211.

FIG. 13B illustrates an embodiment of a DAS system, wherein one or more resonant sensing mechanisms 1204 may be attachments to the DAS device 213. The mechanism 1204 may provide for the retention of the exterior of the DAS device 213, and then the fibers 308 may be wrapped around the perimeter of the mechanism 1204. For some embodiments, the fibers 308 may be attached to the inside perimeter of the mechanism 1204. The attached mechanism 1204 may resonate at the frequency of the source tone (i.e., excitation frequency) and may exhibit a high Q. Therefore, the mechanism 1204 may enhance the configuration sensitivity by imposing an amplified strain signal on the fibers 308. The strain may provide for enhanced acoustic signals detected by the DAS instrument 211.

FIG. 13C illustrates an embodiment of a DAS system, wherein the DAS device 213 is opened so that at least one fiber 308 is spliced on to an input pigtail 1208 in order to pass the optical signal through a resonant sensor 1206. The optical signal may exit an output pigtail 1209 through a similar splice, completing the continuity of the cable system. For some embodiments, the resonant sensor 1206 may contain a fused, monolithic glass assembly providing for an internal cane waveguide 1210 (e.g., a waveguide having a diameter of at least 0.3 mm) and an external shell 1212. The fused assembly may be fabricated such that it resonates with a high Q at the tone of the source 214, thereby amplifying the effect of the incoming acoustic fields on the internal cane waveguide 1210. Owing to the amplification effect of the high Q, there may be an enhanced acoustic field imposed on the cane waveguide 1210 as well as an enhanced strain imposed on the cane waveguide 1210. The enhanced acoustic field and strains may provide for increased sensitivity to signals detected by the DAS instrument 211. For some embodiments, the diameter of the external shell 1212 may be greater in the area surrounding the cane waveguide 1210 than at the ends of the external shell 1212. Therefore, when pressures from the incoming acoustic fields hit the external shell 1212, the cane waveguide 1210 may be placed under greater compression, amplifying the effect of the incoming acoustic fields even further.

Applications

Figure 14:
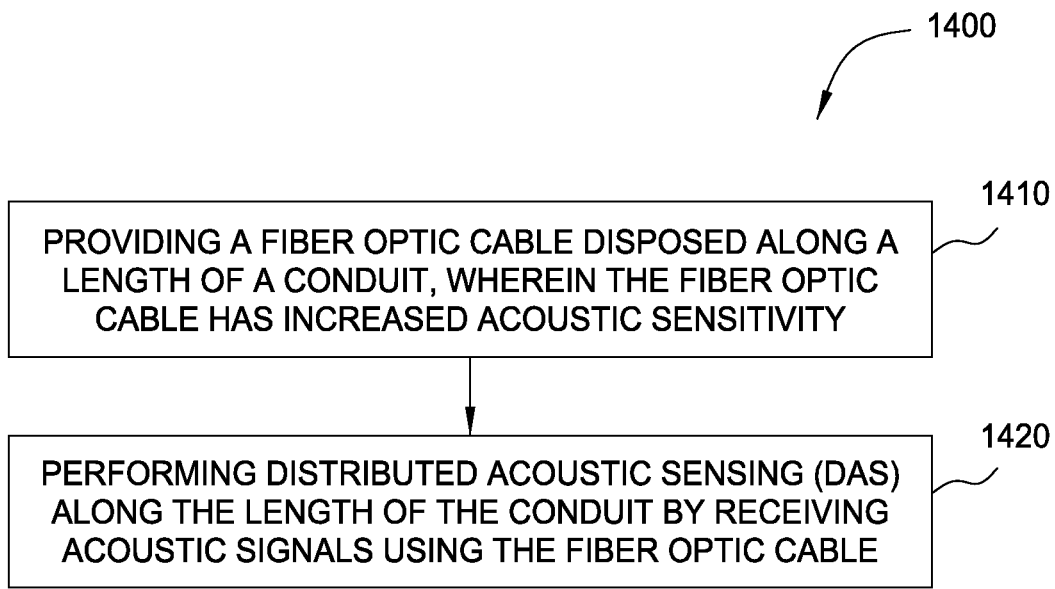
FIG. 14 is a flow diagram of exemplary operations for performing acoustic sensing based on DAS along a length of a conduit using a fiber optic cable with increased acoustic sensitivity, according to an embodiment of the present invention.

FIG. 14 illustrates operations 1400 for performing acoustic sensing based on DAS with increased acoustic sensitivity. The operations may begin by providing an acoustic energy source, such as active acoustic energy source 214, wherein the acoustic energy source produces acoustic stimulation along a length of a conduit. For some embodiments, the acoustic signals may be generated passively, such as sounds produced from a valve or a turbulent flow within the wellbore 102 (e.g., gurgling or whistling), rather than from the active acoustic energy source 214. At 1410, a fiber optic cable, such as the DAS device 213, may be provided along the length of the conduit, wherein the fiber optic cable has increased acoustic sensitivity. At 1420, DAS may be performed along the length of the conduit by receiving the acoustic signals using the fiber optic cable. A DAS instrument, such as DAS instrument 211, may measure disturbances in scattered light that may be propagated within the DAS device. The disturbances in the scattered light may be due to the acoustic signals (e.g., generated by the acoustic energy source), wherein the acoustic signals may change the index of refraction or mechanically deform the DAS device such that the Rayleigh scattered signal changes.

Increasing the acoustic sensitivity of a DAS device used in a DAS system may allow better detection of changes in strain along a fiber's core from acoustic disturbances. For some embodiments, increasing the acoustic sensitivity may allow for detection of issues with components, such as a valve, choke, or sleeve (e.g., whether a valve is open or closed). Further, a unique acoustic signature may be determined for each component and/or situation (e.g., leak detection) so as to isolate issues, wherein a signature may be compared to a catalog or database of acoustic signatures (e.g., a lookup table).

For some embodiments, increasing the acoustic sensitivity may allow for measurement of any downhole vibration as a quality control or health check of completion components. For some embodiments, increasing the acoustic sensitivity may allow for measurement of vibrations that may be used as a seismic source. For some embodiments, increasing the acoustic sensitivity may allow for correlation of vibration/acoustics to various downhole conditions associated with, for example, chokes at various valve positions, gas lift valve operations, downhole pumps for artificial lift, downhole separators, subsurface safety valve (SSSV) operations, inflow of fluids from a reservoir, inflow through sand screens, inflow control devices (ICDs), gravel packing operations, downhole perforating, downhole stimulation, leak detection, and seismic and micro-seismic disturbances.

Therefore, different acoustic signatures may be determined for the above described downhole conditions. For example, for gas lift valve operations, a unique acoustic signature may be predetermined to indicate when the gas lift valve is operating at the opening/closing pressure. As another example, for a downhole pump for artificial lift, a unique acoustic signature may be predetermined to indicate when a load is transferred from one valve of the pump to another valve. For downhole separators, a unique acoustic signature may be predetermined to indicate whether a particular phase has been separated from a fluid stream. For inflow of fluids from a reservoir (e.g., via ICDs), a unique acoustic signature may be predetermined to indicate a certain production rate from the reservoir. For gravel packing operations, a unique acoustic signature may be predetermined to indicate whether the gravel packing operation was successful (e.g., no production of formation sand). For downhole perforation, different acoustic signatures may be predetermined to indicate how well a conduit has been perforated.

For some embodiments, flow metering measurements such as flow velocity and speed of sound in a fluid may be determined. For some embodiments, coarse flow measurements may be determined by detecting propagating disturbances. For some embodiments, the percentage of sand in a flow may be determined based on an acoustic signature. For some embodiments, the integrity of a tubing may be determined by detecting changes in an acoustic signature, which may indicate a leak or corrosion of the tubing. Corrosion may cause thinning of the tube, which may yield a different acoustic signature than an uncorroded tube. A leak of the tubing may also yield a different acoustic signature, such as a gurgling or whistling noise. For some embodiments, tracking the location of a pig along a pipeline or detecting a slug in a wellbore may be determined based on an acoustic signature.

While the foregoing is directed to embodiments of the present invention, other and further embodiments of the invention may be devised without departing from the basic scope thereof, and the scope thereof is determined by the claims that follow.

The invention claimed is:

1. A fiber optic cable used for distributed acoustic sensing (DAS), comprising:
   an outer tube;
   an inner tube surrounded by the outer tube; and
   one or more optical fibers surrounded by the inner tube, wherein the one or more optical fibers have increased acoustic sensitivity compared to a standard optical fiber, wherein at least one of the one or more optical fibers have a smaller diameter compared to the standard optical fiber, and wherein, upon application of pressures created by acoustic waves, the smaller diameter provides for increased response of the fibers when compared to the standard optical fiber.

2. The fiber optic cable of claim 1, wherein at least one of the one or more optical fibers comprise:
   a core;
   a cladding surrounding the core; and
   a fiber coating surrounding the cladding.

3. The fiber optic cable of claim 2, wherein at least one of the one or more optical fibers further comprise holes lengthwise within the cladding.

4. The fiber optic cable of claim 3, wherein the holes enhance strain sensitivity of the one or more optical fibers compared to the standard optical fiber.

5. The fiber optic cable of claim 3, wherein the holes are arranged such that pressures created by acoustic waves are focused on the core.

6. The fiber optic cable of claim 2, wherein the fiber coating comprises graded layers with at least one of different materials or different thicknesses.

7. The fiber optic cable of claim 2, wherein a modulus of the fiber coating is modified to have the increased acoustic sensitivity.

8. The fiber optic cable of claim 1, wherein fiber composition of at least one of the one or more optical fibers are modified to have the increased acoustic sensitivity.

9. A fiber optic cable used for distributed acoustic sensing (DAS), comprising:
   an outer tube comprising one or more slotted holes in a body of the outer tube;
   an inner tube surrounded by the outer tube; and
   one or more optical fibers surrounded by the inner tube.

10. The fiber optic cable of claim 9, wherein the one or more slotted holes allow fluid ingress from an outer environment of the outer tube towards the inner tube to enhance acoustic coupling between the inner tube and the environment of the outer tube.

11. The fiber optic cable of claim 9, wherein the inner tube comprises a corrosion-resistant material.

12. A fiber optic cable used for distributed acoustic sensing (DAS), comprising:
   one or more sensing regions along a length of the cable having a first acoustic sensitivity; and
   one or more segments having a second acoustic sensitivity, connecting the one or more sensing regions, wherein the first acoustic sensitivity is greater than the second acoustic sensitivity.

13. The fiber optic cable of claim 12, wherein each of the one or more sensing regions have different acoustic signatures to distinguish at least a first sensing region from a second sensing region.

14. The fiber optic cable of claim 12, further comprising local attachments to provide increased acoustic sensitivity, wherein the local attachments include a resonant sensor mechanism to enhance coupling of acoustic signals.

15. The fiber optic cable of claim 14, wherein the resonant sensor mechanism is attached to an outer tube or an inner tube of the cable.

16. The fiber optic cable of claim 14, wherein the resonant sensor mechanism is attached to one or more fibers within an inner tube of the cable.

17. The fiber optic cable of claim 16, wherein the resonant sensor mechanism is spliced into a signal path of at least one of the one or more of fibers using input and output pigtails on waveguide components contained within the resonant sensor mechanism.

18. The fiber optic cable of claim 17, further comprising a cane waveguide coupled to the resonant sensor mechanism, wherein the cane waveguide is spliced into a fiber path using the input and output pigtails.

19. The fiber optic cable of claim 17, further comprising a fiber waveguide coupled to the resonant sensor mechanism, wherein the fiber waveguide is spliced into a fiber path using the input and output pigtails.

20. The fiber optic cable of claim 14, wherein the resonant sensor mechanism comprises tuned mechanical amplifiers such as Helmholtz cavity structures, tuning fork structures, or flextensional structures.

21. The fiber optic cable of claim 14, wherein the local attachments are interrogated using an acoustic energy source in a tone burst mode so as to enable signal processors to conduct non-crosstalking measurements of individual local attachments.

22. The fiber optic cable of claim 12, wherein at least one of the one or more sensing regions are clamped along a length of a conduit, to couple pressures created by acoustic waves generated along the length of the conduit with the cable.

23. A method, comprising:
   providing a fiber optic cable disposed along a length of a conduit, wherein the fiber optic cable comprises:
      an outer tube comprising one or more slotted holes in a body of the outer tube;
      an inner tube surrounded by the outer tube; and
      one or more optical fibers surrounded by the inner tube; and
   performing distributed acoustic sensing (DAS) along the length of the conduit by receiving acoustic signals using the fiber optic cable.

24. The method of claim 23, wherein the acoustic signals are generated from a passive source.

25. The method of claim 24, wherein the passive source is seismic or micro-seismic activity in a formation surrounding the conduit.

26. The method of claim 24, wherein the passive source is flow in or around the conduit.

27. The method of claim 23, further comprising:
   providing an acoustic energy source, wherein the acoustic energy source produces acoustic stimulation along the length of the conduit.

28. The method of claim 27, wherein the acoustic signals are generated from the acoustic energy source.

29. The method of claim 23, wherein the performing comprises:
   measuring disturbances in scattered light propagated within the fiber optic cable.

30. The method of claim 29, wherein the disturbances in the scattered light are due to the acoustic signals, wherein the acoustic signals change an index of refraction or mechanically deform the fiber optic cable such that a Rayleigh scattered signal changes.

31. The method of claim 23, wherein performing acoustic sensing comprises performing acoustic sensing at one or more discrete circumference areas along the conduit.

32. The method of claim 31, wherein the fiber optic cable is wrapped in a spiral manner around the conduit at the one or more discrete circumference areas.

33. The method of claim 23, wherein the one or more slotted holes allow fluid ingress from an outer environment of the outer tube towards the inner tube to enhance acoustic coupling between the inner tube and the environment of the outer tube.

34. The method of claim 23, wherein the fiber optic cable comprises a filler material to enhance acoustic coupling between the one or more optical fibers and the inner tube.

35. The method of claim 34, wherein a fill percentage of the filler material is increased to enhance the acoustic coupling.

36. The method of claim 23, wherein the fiber optic cable comprises a filler material to enhance acoustic coupling between the inner tube and the outer tube.

37. The method of claim 23, wherein the fiber optic cable comprises an encapsulant material to enhance acoustic coupling between the outer tube and an environment surrounding the outer tube.

38. The method of claim 23, wherein performing DAS comprises:
correlating the acoustic signals to downhole conditions associated with at least one of chokes at various valve positions, gas lift valve operations, downhole pumps for artificial lift, downhole separators, subsurface safety valve (SSSV) operations, inflow of fluids from a reservoir, inflow through sand screens, inflow control devices (ICDs), gravel packing operations, downhole perforating, downhole stimulation, leak detection, and seismic and micro-seismic disturbances.

39. The method of claim 38, wherein the downhole conditions, downhole components, or an operational state of the downhole components are identified by respective acoustic signatures.

40. The method of claim 39, wherein the acoustic signatures are compared to a database of acoustic signatures to identify the downhole conditions, the downhole components, or the operational state of the downhole components.

* * * * *